(12) United States Patent
Adams et al.

(10) Patent No.: US 7,942,325 B2
(45) Date of Patent: May 17, 2011

(54) OPTIMIZED SMART CARD DRIVER PERFORMANCE

(75) Inventors: Neil Patrick Adams, Waterloo (CA); Herbert A. Little, Waterloo (CA); Ravi Singh, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 532 days.

(21) Appl. No.: 12/021,389

(22) Filed: Jan. 29, 2008

(65) Prior Publication Data

US 2009/0188977 A1    Jul. 30, 2009

(51) Int. Cl.
*G06K 7/01* (2006.01)
(52) U.S. Cl. .......................................... 235/439
(58) Field of Classification Search .................. 235/436, 235/492
See application file for complete search history.

(56) References Cited

U.S. PATENT DOCUMENTS

| 5,559,800 | A | 9/1996 | Mousseau et al. |
| 6,942,147 | B2 * | 9/2005 | Lahteenmaki et al. ........ 235/441 |
| 7,350,717 | B2 * | 4/2008 | Conner et al. ................. 235/492 |
| 7,395,973 | B2 * | 7/2008 | Ho ................................. 235/492 |
| 2008/0011851 | A1 * | 1/2008 | Adams et al. .................. 235/451 |
| 2009/0215385 | A1 * | 8/2009 | Waters et al. ...................... 455/1 |

FOREIGN PATENT DOCUMENTS

EP    1890426 A1    2/2008

* cited by examiner

*Primary Examiner* — Seung H Lee
(74) *Attorney, Agent, or Firm* — Ridout & Maybee LLP (57) ABSTRACT

By splitting a smart card driver into multiple components, with one component residing on the mobile communication device and another component residing on the smart card reader, the smart card reader driver component is enabled to do more than merely relay communication between the mobile communication device and the smart card. By transferring part of the communication handling of the smart card driver to the smart card reader, a reduction in communication over the connection between the smart card reader and mobile communication device advantageously results in a more efficient transaction.

22 Claims, 6 Drawing Sheets

OPTIMIZED SMART CARD DRIVER PERFORMANCE

FIELD OF THE INVENTION

The present application relates generally to communication between a device and a smart card reader for reading a smart card and, more specifically, to optimizing the performance of a smart card driver.

BACKGROUND OF THE INVENTION

A device that reads information from, or writes information to, a smart card typically does so using a smart card reader. The smart card reader may be connected, e.g., through a directly wired connection or a wireless connection, to the device. Specific software, called a "driver", is generally executed by the device to facilitate reading from, and writing to, the memory component of the smart card using the smart card reader. The driver includes an application programming interface (API) that allows other programs to issue requests and commands that will be understood by the driver. An API generally comprises a source code interface that a computer system or program library provides in order to support requests for services to be made of it by a computer program.

When the connection between the device and the smart card reader is wireless, for example, using the Bluetooth™ wireless communication protocol, some complications arise. In a typical transaction, the device transmits, over the wireless connection, a request to the smart card reader and the smart card reader forwards the request to the smart card. The smart card then responds to the request with a response and the smart card reader forwards the response, over the wireless connection, to the device. Unfortunately, the speed (e.g., measured in bits per second) generally available for the wireless connection limits the speed with which the device can make use of the smart card, e.g., to authenticate a user of the device. The smart card driver is located on the device and has knowledge of how to talk to the smart card which is located in the smart card reader. There are many cases where, in order to perform an operation, there is a requirement for several transactions.

BRIEF DESCRIPTION OF THE DRAWINGS

Reference will now be made to the drawings, which show by way of example, embodiments, and in which.

DETAILED DESCRIPTION OF THE EMBODIMENTS

By splitting a smart card driver into multiple components; with one component residing on the mobile communication device and the other component residing on the smart card reader, the smart card reader driver component is enabled to do more than merely relay communication between the mobile communication device and the smart card. By transferring part of the communication handling of the smart card driver to the smart card reader, a reduction in communication over the connection between the smart card reader and mobile communication device advantageously results in a more efficient transaction.

In accordance with an aspect of the present application there is provided a method of communicating with a smart card. The method includes receiving a command code message from a device, determining an interpretation of the command code message and, according to the interpretation of the command code message, transmitting a plurality of request command Application Protocol Data Units to a smart card. The method further includes receiving a plurality of response Application Protocol Data Units from the smart card, each individual response Application Protocol Data Unit of the plurality of response Application Protocol Data Units corresponding to an individual request command Application Protocol Data Unit among the plurality of request command Application Protocol Data Units, amalgamating the plurality of response Application Protocol Data Units into an amalgamated response and transmitting the amalgamated response to the device. In other aspects of the present application, a smart card reader is provided for carrying out this method and a computer readable medium is provided for adapting a processor in a smart card reader to carry out this method.

Other aspects and features of the present application will become apparent to those of ordinary skill in the art upon review of the following description of specific embodiments of the application in conjunction with the accompanying figures.

Figure 1:
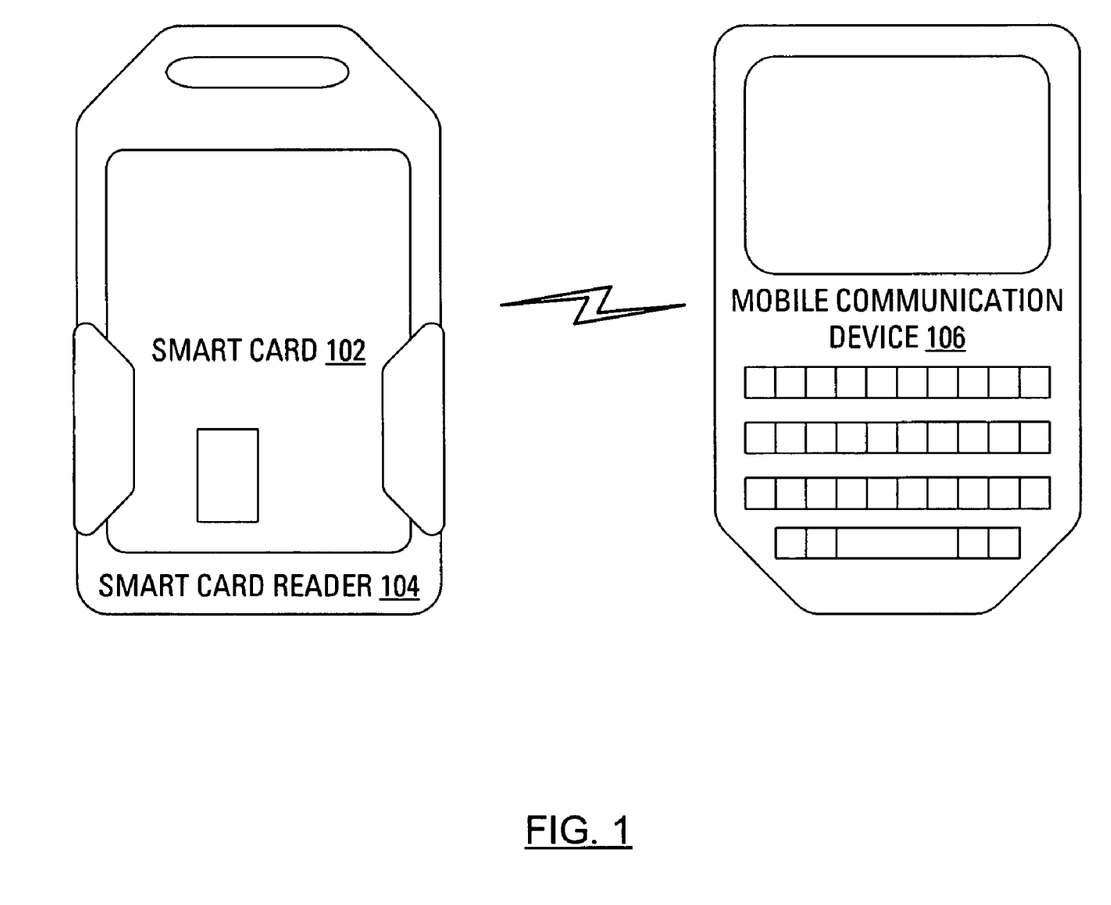
FIG. 1 illustrates an environment in which a smart card is illustrated along with a mobile communication device that communicates wirelessly with a smart card reader.

FIG. 1 illustrates an exemplary communication system 100 that includes a mobile communication device 106 that is enabled to communicate wirelessly with a peripheral device in the form of a smart card reader 104. A smart card 102 is illustrated mounted in the smart card reader 104.

Figure 2:
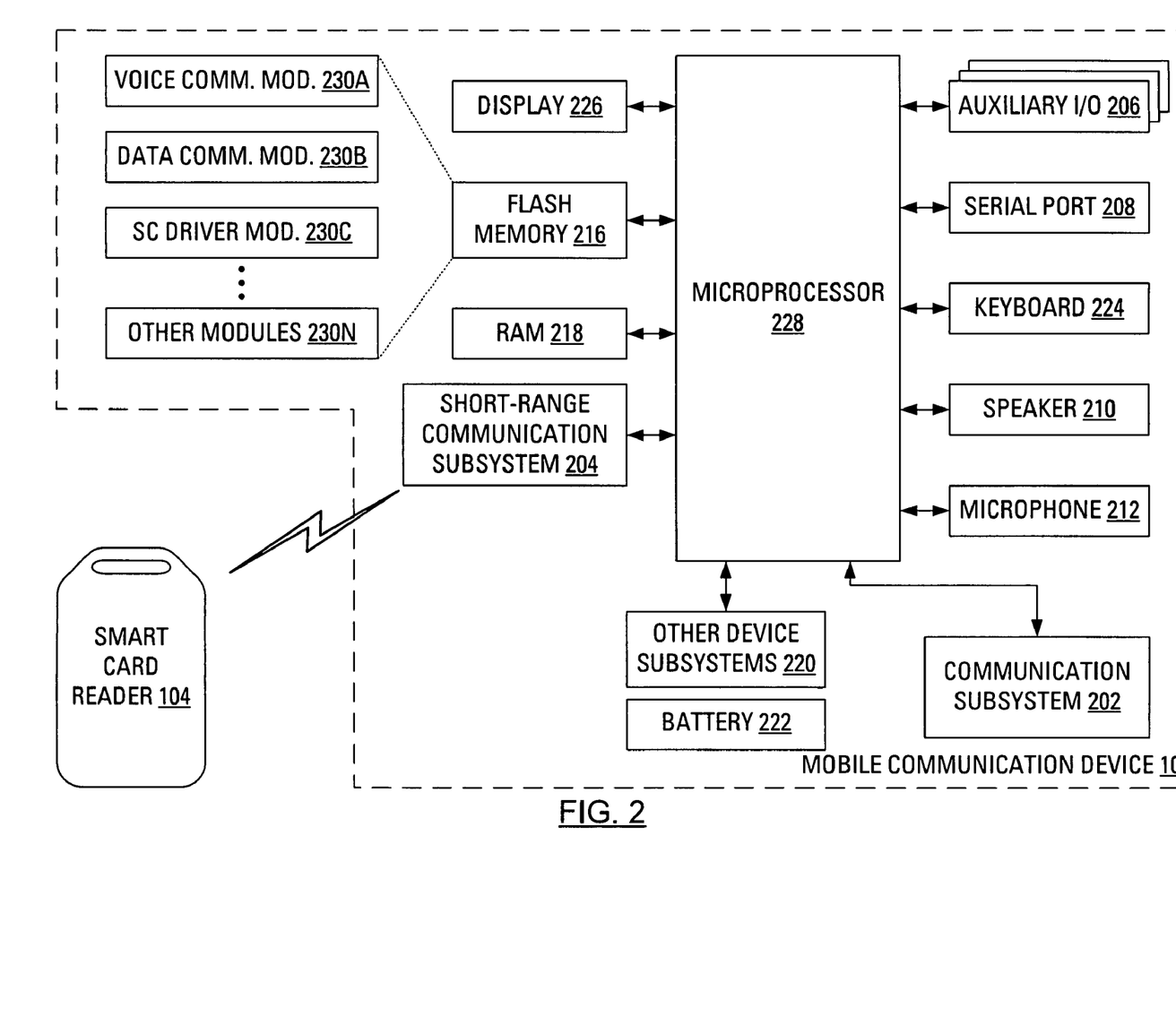
FIG. 2 schematically illustrates the mobile communication device of FIG. 1.

FIG. 2 illustrates the mobile communication device 106 including a housing, an input device (e.g., a keyboard 424 having a plurality of keys) and an output device (e.g., a display 226), which may be a full graphic, or full color, Liquid Crystal Display (LCD). In some embodiments, the display 226 may comprise a touchscreen display. In such embodiments, the keyboard 424 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 106, in part, responsive to actuation of the keys on the keyboard 224 by a user.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture, to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader also implements a Bluetooth™ communication module. As another example, the short-range communications subsystem 204 may include an infrared device to provide for communication with similarly-enabled systems and devices.

Figure 3:
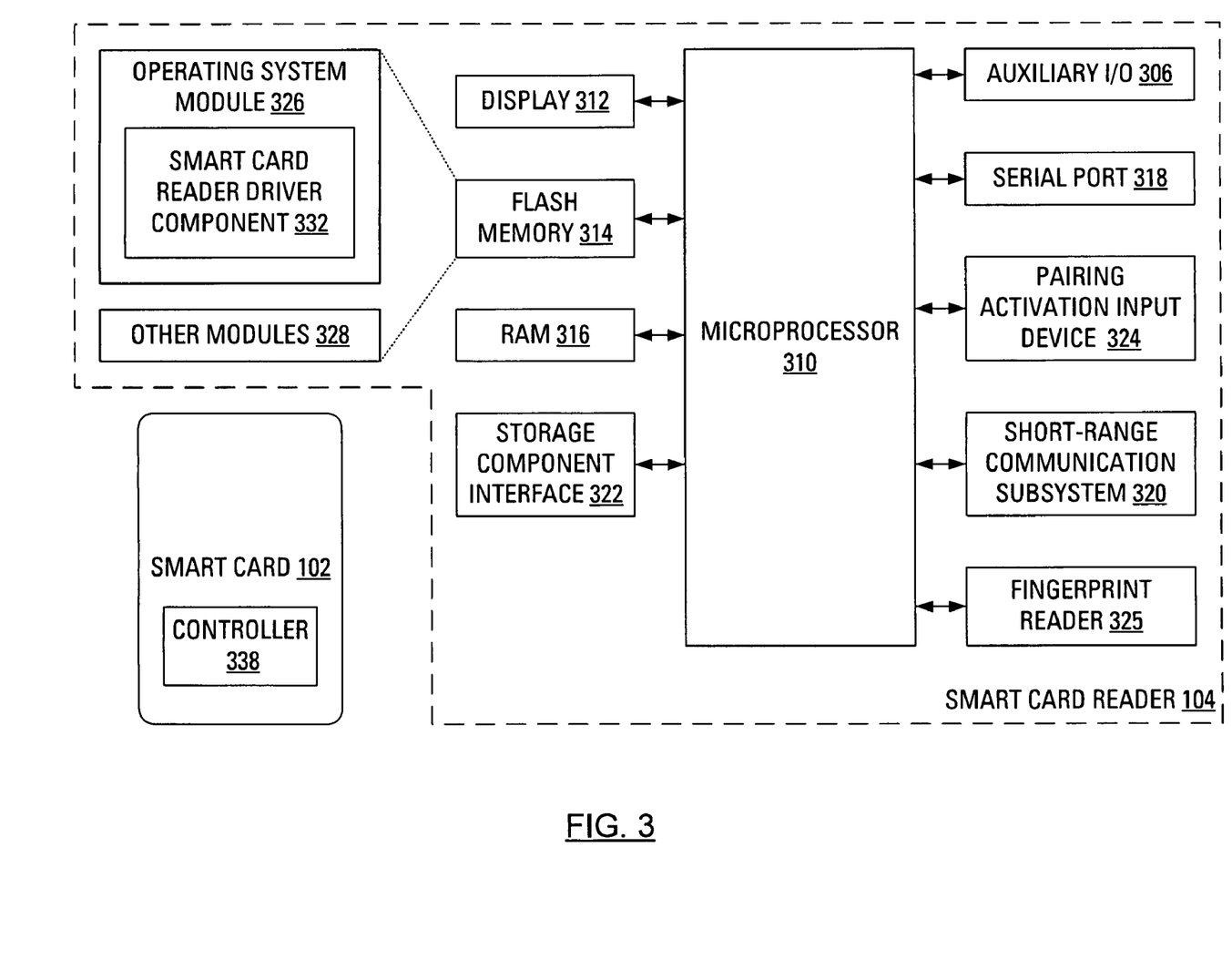
FIG. 3 schematically illustrates the smart card reader of FIG. 1.

FIG. 3 illustrates an example embodiment of the smart card reader 104. The smart card reader 104 includes a controller including at least one smart card reader microprocessor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a RAM 316, a serial port 318 (e.g., a USB port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the RAM 316 includes a portion allocated to a data cache.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. The operating system module code 326, code for specific device application modules 328, code for the smart card reader driver component 332, or code components thereof, may be temporarily loaded into a volatile storage medium such as the RAM 316. Received communication signals and other data may also be stored in the RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader microprocessor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code module or components are then installed by the user (or automatically) in the RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 could be installed as one of the software applications 328 so long as suitable security related precautions are taken to ensure that the smart card reader driver component 332 cannot be modified or tampered with by unauthorized users.

The serial port 318 may be a USB-type interface port for interfacing or synchronizing with another device, such as a personal computer or the mobile communication device 106. The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

Traditionally, a smart card driver module is supplied by the manufacturer of the smart card 102. The operating system of the mobile communication device 106 includes an API defining a smart card framework. The smart card driver module registers with the operating system of the mobile communication device 106 so that calls to smart card framework aspects of the API can be appropriately handled by the smart card driver module.

Figure 4:
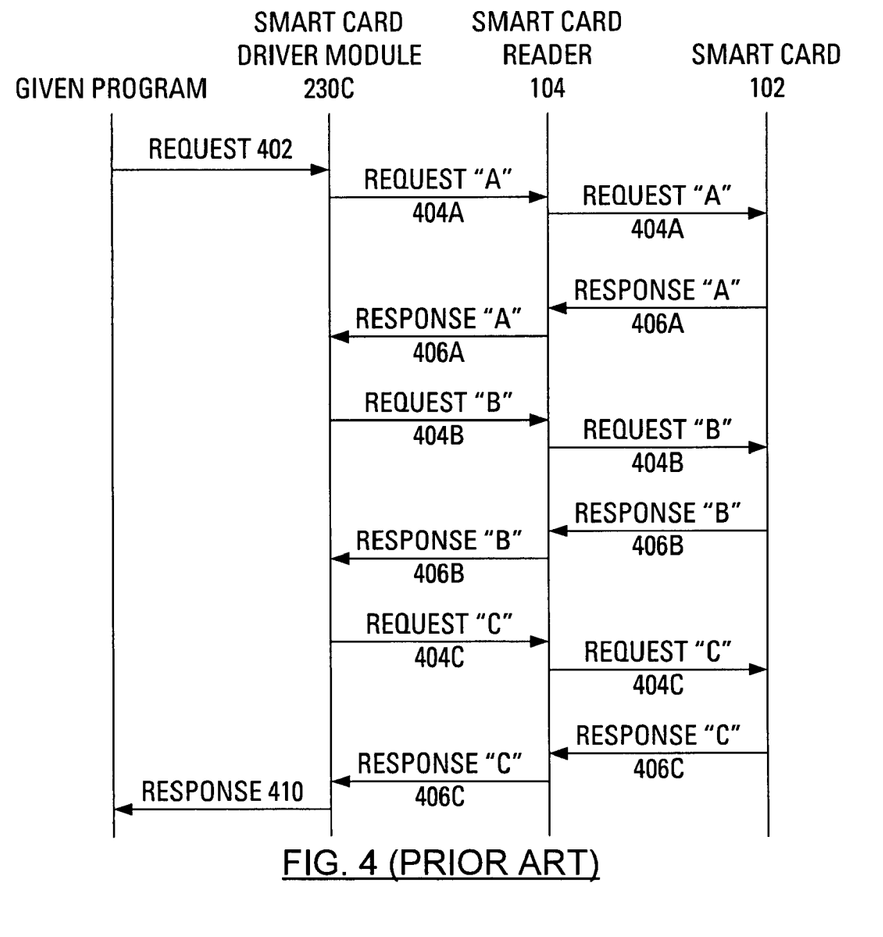
FIG. 4 illustrates a representation of known interaction between a smart card driver module at a mobile communication device, a smart card reader driver component at the smart card reader of FIG. 3 and the smart card of FIG. 1.

A representation of a prior art interaction between a smart card driver module at the mobile communication device 106, the smart card reader 104 at the smart card reader 104 and the smart card 102 is illustrated in FIG. 4.

Communication between the smart card reader 104 and the smart card 102 may be standardized to use Application Protocol Data Units (APDUs), where a standard structure for an APDU is defined by ISO 7816. There are two categories of APDUs: command APDUs; and response APDUs. A command APDU is sent by the smart card reader 104 to the smart card 102. A command APDU contains a header and may contain data. A response APDU is sent by the smart card 102 to the smart card reader 104. A response APDU contains a status word and may contain data.

When a given program executed on the microprocessor 228 requires input from the smart card 102, the given program sends an initial request 402 to the smart card framework, which request is redirected, by the smart card framework, to the smart card driver module, which is also executed by the microprocessor 228. Responsive to receiving the request, the smart card driver module issues a request command "A" APDU 404A to the smart card 102, via the smart card reader 104. Upon receiving the request command "A" APDU 404A from the smart card driver module, the smart card reader 104 forwards the request command "A" APDU 404A to the smart card 102. Note that, in general, a request command APDU 404 may be transmitted to the smart card 102 in bits and pieces. Such piecewise transmission is provided for in protocols known as T=0 and T=1 as part of ISO 7816, which is an international standard related to electronic identification cards, especially smart cards, managed jointly by the International Organization for Standardization (ISO) and the International Electrotechnical Commission (IEC). The smart card 102 receives the request command "A" APDU 404A and responds by sending a response "A" APDU 406A to the smart card reader 104. The smart card reader 104, upon receiving the response "A" APDU 406A, forwards the response "A" APDU 406A to the smart card driver module.

Responsive to receiving the response "A" APDU 406A, the smart card driver module transmits a request command "B" APDU 408B to the smart card reader 104. The smart card reader 104 then merely passes the request command "B" APDU 408B to the smart card 102. The smart card 102 receives the request command "B" APDU 404B and responds by sending a response "B" APDU 406B to the smart card reader 104. The smart card reader 104, upon receiving the response "B" APDU 406B, forwards the response "B" APDU 406B to the smart card driver module.

Responsive to receiving the response "B" APDU 406B, the smart card driver module transmits a request command "C" APDU 408C to the smart card reader 104. The smart card reader 104 then merely passes the request command "C" APDU 408C to the smart card 102. The smart card 102 receives the request command "C" APDU 404C and responds by sending a response "C" APDU 406C to the smart card reader 104. The smart card reader 104, upon receiving the response "C" APDU 406B, forwards the response "C" APDU 406C to the smart card driver module.

It is expected that the exchange between the smart card driver module and the smart card 102 will include more than the three requests and corresponding responses in the example discussed above in conjunction with FIG. 4. Indeed, there may be as few as one request and corresponding response and there may be many more than three. For economy of illustration, only three requests and corresponding responses have been included in FIG. 4. It is further expected that the smart card driver module at the mobile communication device 106 will obtain enough information from the received response "C" APDU 406C to determine that the response "C" APDU 406C is the final response.

Accordingly, the smart card driver module at the mobile communication device 106 amalgamates the received response APDUs 406A, 406B, and 406C to form an amalgamated response 410 and sends the amalgamated response 410 to the given program that was the source of the initial request 402.

Clearly, the amount of traffic between the mobile communication device 106 and the smart card reader 104 is a factor in the time delay between the given program sending the initial request 402 and receiving the amalgamated response 410.

In an example scenario, the smart card 102 may contain several certificates. When the given prior art program requires the certificates from the smart card 102, the given prior art program sends a certificate retrieval request to the smart card framework, which request is redirected, by the smart card framework, to the smart card driver module. Responsive to receiving the request, the smart card driver module issues a plurality of request command APDUs to the smart card 102, via the smart card reader 104. Upon receiving the request command APDUs from the smart card driver module, the smart card reader 104 forwards the request command APDUs to the smart card 102. The smart card 102 receives the request command APDUs and responds by sending a response APDUs to the smart card reader 104. The smart card reader 104, upon receiving each response APDU, forwards the response APDU to the smart card driver module. Note that each certificate may require multiple APDUs to transfer from the smart card reader 104 to the mobile communication device 106 and, furthermore, the smart card 102 may store many certificates.

Upon receiving the last of the response APDUs, the smart card driver module at the mobile communication device 106 can assemble each of the certificates from the pieces transferred in distinct APDUs and amalgamate the collection of certificates into an amalgamated response message and sends the amalgamated response message to the given program that was the source of the initial certificate retrieval request.

In overview, it is proposed herein to split the smart card driver into multiple components, with a component residing on the mobile communication device 106 and another component residing on the smart card reader 104. That is, it is proposed to enable the operating system module 326 of the smart card reader 104, through the addition of the smart card reader driver component 332, to do more than merely relay communication between the mobile communication device 106 and the smart card 102.

When there is a requirement for the mobile communication device 106 to read from, or write to, the smart card 102, the smart card driver module 230C on the mobile communication device 106 transmits a "command code message", carrying a command code in addition to a small amount of other data, to the smart card reader 104.

One example command code message is a "get certificates" command code message, which involves the mobile communication device 106 requesting that the smart card reader 104 obtain certificates from the smart card 102 and transmit the certificates to the mobile communication device 106. Another example command code message is a "sign data" command code message, which involves the mobile communication device 106 transferring data to the smart card reader 104 so that the smart card 102 can create a digital signature based on the data and have the smart card reader 104 transmit the digital signature to the mobile communication device 106.

An example format for a command code message includes: a command tag; a driver ID; a command type; and command data. The command tag element is included to allow the smart card reader driver component 332 of the smart card reader 104 to distinguish a command code message from a typical request message. The driver ID element is included to specify an identity (ID) of a smart card reader driver component on the smart card reader 104, so that the operating system module 326 can determine the smart card reader driver component 332 to which to pass the command code message. There may be several possible values for the command type element, where the values are defined for specific drivers. The values of the command type element may, for example, allow the smart card reader driver component 332 to distinguish between a get certificates command code message and a sign data command code message. Similarly, the content of the command data element is specific to the driver and specific to the command type. For example, if the command type indicates that the command code message is a sign data command code message, then the content of the command data element is the data that is to be signed.

It is expected that the operating system module 326 of the smart card reader 104 will include more than one smart card reader driver component. Indeed, there is likely to be a corresponding smart card reader driver component for every smart card driver module at the mobile communication device 106. More particularly, it is likely that the smart card reader driver component and the smart card driver module will be programmed by the same person, or at least the same organization.

It is expected that each smart card reader driver component loaded onto the smart card reader 104 will register itself with a central driver information store (not shown) on the smart card reader 104 and will be associated with a unique driver ID at the time of registration. When the smart card reader 104 synchronizes settings with the mobile communication device 106, the smart card reader 104 may transmit, to the mobile communication device 106, a list of driver IDs associated with installed smart card reader driver components. The smart card API on the mobile communication device 106 may expose a way for smart card driver modules on the mobile communication device 106 to determine driver IDs for smart card reader driver components installed on the smart card reader 104.

Accordingly, when the smart card driver module has a requirement to send a command to the smart card reader 104, the smart card driver module first determines, through a query to the smart card API on the mobile communication device 106, whether the appropriate smart card reader driver component is present on the smart card reader 104.

Once the driver ID of the appropriate smart card reader driver component is determined, the smart card driver module may include the driver ID in the driver ID element of a command code message to be sent to the smart card reader 104.

Upon receiving a given command code message, the operating system module 326 of the smart card reader 104 determines the particular smart card reader driver component to which to direct the given command code message. Such determining may be accomplished based on a review of the driver ID element of the given command code message.

Upon receiving the command code message, the smart card reader driver component 332, on the smart card reader 104, determines an interpretation of the command code and, according to the interpretation, carries out an exchange of requests and responses with the smart card 102. When the exchange with the smart card 102 is complete, the smart card reader driver component 332 on the smart card reader 104 transmits an amalgamated response to the mobile communication device 106. Advantageously, the volume of traffic between the mobile communication device 106 and the smart card reader 104 is greatly reduced.

Figure 5:
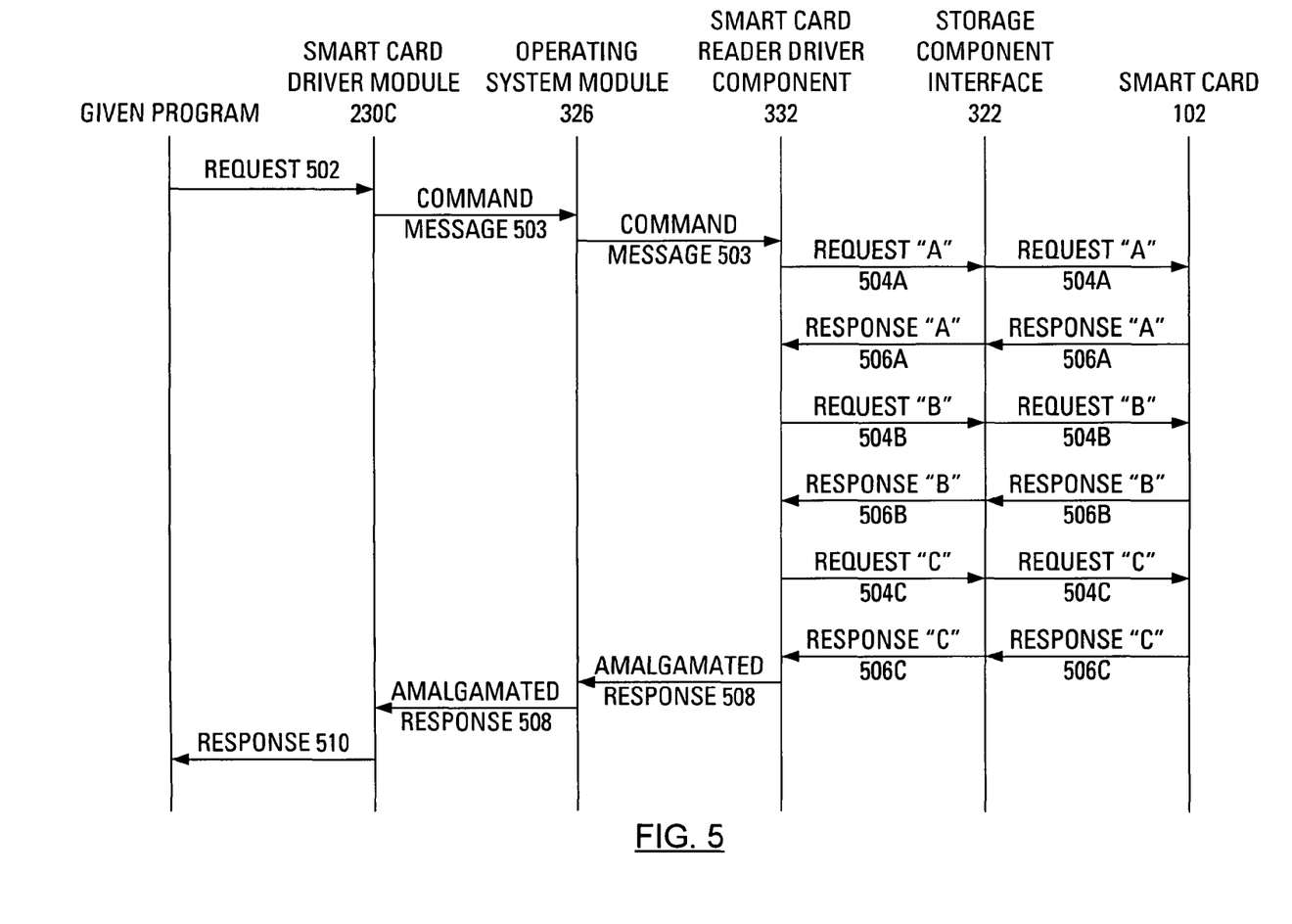
FIG. 5 illustrates a representation of interaction between the smart card driver module of the mobile communication device of FIG. 2, the smart card reader driver component of the smart card reader of FIG. 3 and the smart card of FIG. 1.

In accordance with various embodiments of the present disclosure, a representation of interaction between the smart card driver module 230C, the operating system module 326, the smart card reader driver component 332, reader driver and the smart card 102 is illustrated in FIG. 5. When, as in the representation of known interaction of FIG. 4, a given program executed on the microprocessor 228 requires input from the smart card 102, the given program sends a request 502 to the smart card driver module 230C, which is also executed by the microprocessor 228. Responsive to receiving the request 502, the smart card driver module 230C issues a command code message 503 to the smart card reader 104.

Upon receiving the command code message 503, the operating system module 326 of the smart card reader 104 determines, e.g., based on the content of the driver ID element of the command code message 503, that the command code message 503 should be sent to the smart card reader driver component 332.

Figure 6:
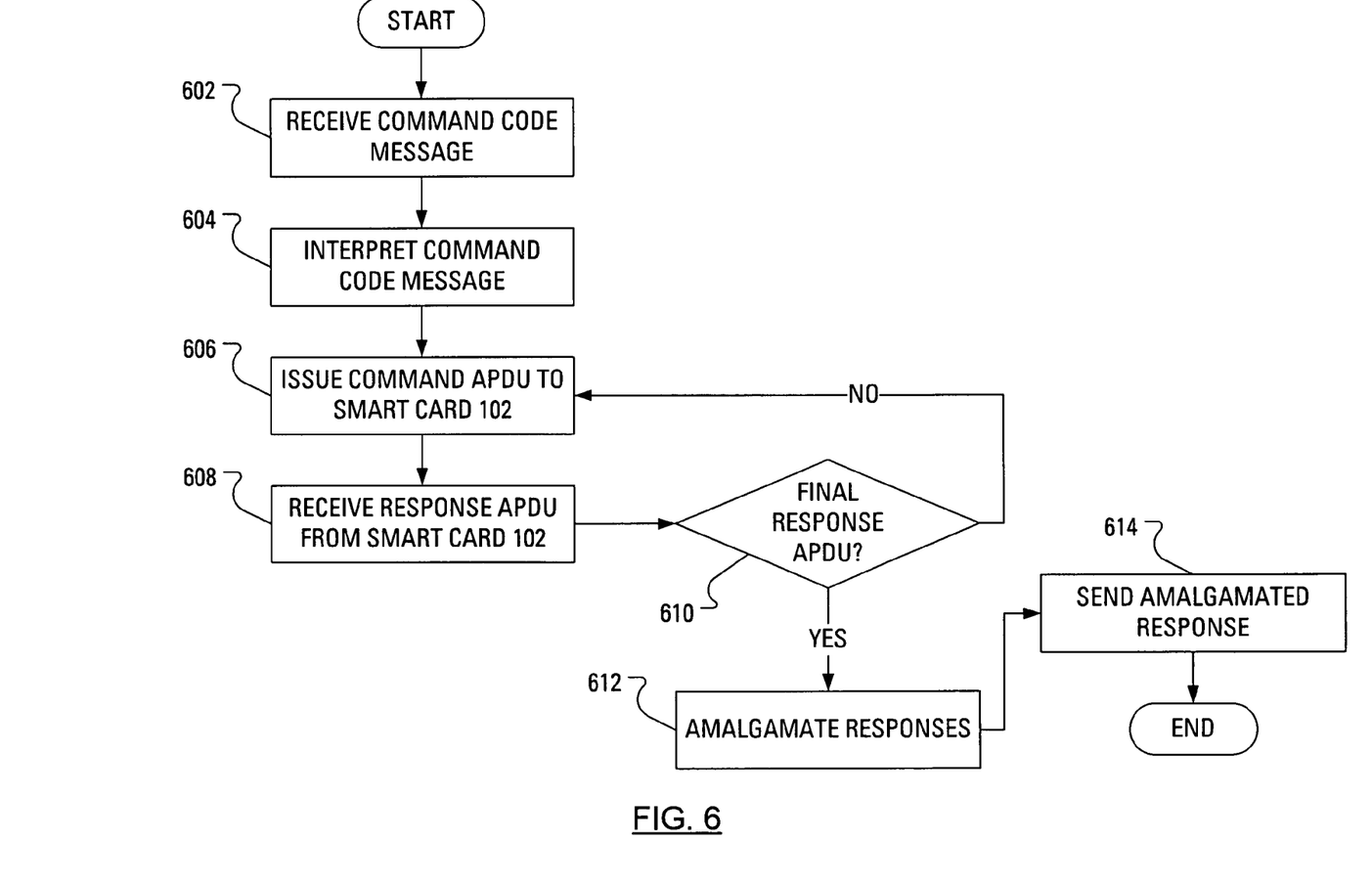
FIG. 6 illustrates steps in an exemplary method performed by the smart card reader driver component on the smart card reader of FIG. 3.

Steps in an exemplary method performed by the smart card reader driver component 332 on the smart card reader 104 are illustrated in FIG. 6. Upon receiving (step 602) the command code message 503 from the operating system module 326, the smart card reader driver component 332 determines (step 604) an interpretation of the command code. According to the interpretation, the smart card reader driver component 332 composes and transmits (step 606) a request command "A" APDU 504A to the storage component interface 322. The storage component interface 322 forwards the request command "A" APDU 504A to the smart card 102. The smart card 102 receives the request command "A" APDU 504A and responds by sending a response "A" APDU 506A to the smart card reader 104.

The response "A" APDU 506A is received at the smart card reader 104 and passed to the smart card reader driver component 332. Responsive to receiving (step 608) the response "A" APDU 506A, the smart card reader driver component 332 determines (step 610) whether the response APDU is the last response APDU to be expected. If the response "A" APDU 506A is determined not to be the last response APDU to be expected, the smart card reader driver component 332 transmits (step 606) a request command "B" APDU 504B to the storage component interface 322, which forwards the request command "B" APDU 504B to the smart card 102. The smart card 102 receives the request command "B" APDU 504B and responds by sending a response "B" APDU 506B to the smart card reader 104.

The response "B" APDU 506B is received at the smart card reader 104 and passed to the smart card reader driver component 332. Responsive to receiving (step 608) the response "B" APDU 506B, the smart card reader driver component 332 determines (step 610) whether the response APDU is the last response APDU to be expected. If the response "B" APDU 506B is determined not to be the last response APDU to be expected, the smart card reader driver component 332 transmits (step 606) a request command "C" APDU 504C to the storage component interface 322, which forwards the request command "C" APDU 504C to the smart card 102. The smart card 102 receives the request command "C" APDU 504C and responds by sending a response "C" APDU 506C to the smart card reader 104.

The response "C" APDU 506C is received at the smart card reader 104 and passed to the smart card reader driver component 332. Responsive to receiving (step 608) the response "C" APDU 506C, the smart card reader driver component 332 determines (step 610) whether the response APDU is the last response APDU to be expected. It is expected that the exchange, through the storage component interface 322, between the smart card reader driver component 332 and the smart card 102 will include more than three requests and corresponding responses, but may be limited to one. However, for economy of illustration, only three have been included in FIG. 5. It is further expected that the smart card reader driver component 332 at the smart card reader 104 will obtain enough information from the received response "C" APDU 506C to determine that the response "C" APDU 506C is the final response.

When the response "C" APDU 506C is determined (step 610) to be the last response APDU to be expected, the smart card reader driver component 332 amalgamates (step 612) the received response APDUs 506A, 506B, 506C to form an amalgamated response 508 and transmits (step 614) the amalgamated response 508 to the operating system module 326, which forwards the amalgamated response 508 to the mobile communication device 106. To distinguish the amalgamated response 508 from other traffic, the amalgamated response 508 may include a reference to the command code message 503.

Upon receiving the amalgamated response 508, the smart card driver module 230C formulates a response 510 to the request 502 from the given program. Such formulating may involve, for several examples, wrapping the data from the amalgamated response 508 in another format/object, adding additional data, removing unneeded data, dropping data, or changing data before sending the response 510 to the given program.

The traffic between the mobile communication device 106 and the smart card reader 104 has been reduced from multiple request command APDUs 404 and response APDUs 406, each request command APDU 404 giving rise to a corresponding response APDU 406, to simply the command code message 503 and the amalgamated response 508.

It should be clear to a person of ordinary skill that the mobile communication device 106 need not completely discontinue the transmission of request command APDUs 404 to the smart card reader 104. Indeed, transmissions from the mobile communication device 106 to the smart card reader 104 may include request command APDUs 404 interleaved with command code messages 503. That is, there may a situation in which the most efficient use of resources involves the transmission of a request command APDU 404 and receipt of a response APDU 406. While, in another situation, the most efficient use of resources involves the transmission of a command code message 503 and receipt of a amalgamated response 508. Rather than for reasons of efficiency, interleaving of command code messages and request APDUs may be useful when there is a requirement to perform a verification of data at the mobile communication device 106. Such may be the case when data involved in the verification is too large or too sensitive to be transmitted to the smart card reader 104.

Implementation of aspects of the present application will likely entail modifying the smart card API of the mobile communication device 106. In particular, rather than providing a single driver for the mobile communication device 106 only, smart card manufacturers may supply multiple drivers: one driver (smart card driver module 230C) for the mobile communication device 106; and one driver (smart card reader driver component 332) for the smart card reader 104.

Alternatively, a single driver may be created for the mobile communication device 106. The single driver may include some embedded code. For example, the embedded code may be written in the JavaScript™ language. The embedded code would be automatically loaded onto the smart card reader 104 the first time the single driver is used by the smart card driver module 230C.

Advantageously, according to aspects of the present application, the volume of traffic between the mobile communication device 106 and the smart card reader 104 is greatly reduced and, consequently, the delay between the given program sending the initial request 502 and receiving the response 510 is also reduced.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At a smart card reader, a method of communicating with a smart card, said method comprising:
   receiving a command code message from a mobile communications device;
   determining an interpretation of said command code message;

according to said interpretation of said command code message, transmitting a plurality of request command Application Protocol Data Units to said smart card;

receiving a plurality of response Application Protocol Data Units from said smart card, each individual response Application Protocol Data Unit of said plurality of response Application Protocol Data Units corresponding to an individual request command Application Protocol Data Unit among said plurality of request command Application Protocol Data Units;

amalgamating said plurality of response Application Protocol Data Units into an amalgamated response; and transmitting said amalgamated response to said device.

2. The method of claim 1 wherein said command code message relates to reading from said smart card.

3. The method of claim 2 wherein said command code message comprises a request for transmission of certificates.

4. The method of claim 1 wherein said command code message relates to writing to said smart card.

5. The method of claim 1 wherein said command code message comprises data, a request for creation of a digital signature based on said data and transmission of said digital signature.

6. The method of claim 1 further comprising performing said receiving said command code message over a wireless connection with said device.

7. The method of claim 6 wherein said wireless connection is a Bluetooth connection.

8. The method of claim 1 further comprising performing said receiving said command code message over a wired connection with said device.

9. The method of claim 1 wherein said transmitting said plurality of request command Application Protocol Data Units to said smart card comprises transmitting said plurality of request command Application Protocol Data Units to a storage component interface for forwarding to said smart card.

10. A smart card reader comprising:
a short range communication subsystem for:
receiving a command code message from a device; and
transmitting an amalgamated response to said device;
a processor for executing a smart card reader driver component to:
determine an interpretation of said command code message; and
amalgamate a plurality of response Application Protocol Data Units into said amalgamated response; and
a storage component interface for:
transmitting, according to said interpretation of said command code message, a plurality of request command Application Protocol Data Units to a smart card; and
receiving said plurality of response Application Protocol Data Units from said smart card, each individual response Application Protocol Data Unit of said plurality of response Application Protocol Data Units corresponding to an individual request command Application Protocol Data Unit among said plurality of request command Application Protocol Data Units.

11. The smart card reader of claim 10 wherein said command code message relates to reading from said smart card.

12. The smart card reader of claim 10 wherein said command code message relates to writing to said smart card.

13. The smart card reader of claim 10 wherein said short range communication subsystem communicates over a wireless connection with said device.

14. The smart card reader of claim 13 wherein said wireless connection is a Bluetooth connection.

15. The smart card reader of claim 10 wherein said short range communication subsystem communicates over a wired connection with said device.

16. A computer-readable medium containing computer-executable instructions that, when performed by processor in a smart card reader, cause said processor to:
receive a command code message from a mobile communications device;
determine an interpretation of said command code message;
transmit, according to said interpretation of said command code message, a plurality of request command Application Protocol Data Units to a smart card;
receive a plurality of response Application Protocol Data Units from said smart card, each individual response Application Protocol Data Unit of said plurality of response Application Protocol Data Units corresponding to an individual request command Application Protocol Data Unit among said plurality of request command Application Protocol Data Units;
amalgamate said plurality of response Application Protocol Data Units into an amalgamated response; and
transmit said amalgamated response to said device.

17. The computer-readable medium of claim 16 wherein said command code message relates to reading from said smart card.

18. The computer-readable medium of claim 16 wherein said command code message relates to writing to said smart card.

19. The computer-readable medium of claim 16 wherein said computer-executable instructions cause said processor to receive said command code message over a wireless connection with said device.

20. The computer-readable medium of claim 19 wherein said wireless connection is a Bluetooth connection.

21. The computer-readable medium of claim 16 wherein said computer-executable instructions cause said processor to receive said command code message over a wired connection with said device.

22. The computer-readable medium of claim 16 wherein said computer-executable instructions further cause said processor to transmit said plurality of request command Application Protocol Data Units to a storage component interface for forwarding to said smart card.

* * * * *